(12) United States Patent
Li

(10) Patent No.: US 11,494,115 B2
(45) Date of Patent: Nov. 8, 2022

(54) SYSTEM METHOD FOR FACILITATING MEMORY MEDIA AS FILE STORAGE DEVICE BASED ON REAL-TIME HASHING BY PERFORMING INTEGRITY CHECK WITH A CYCLICAL REDUNDANCY CHECK (CRC)

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 241 days.

(21) Appl. No.: 15/931,067

(22) Filed: May 13, 2020

(65) Prior Publication Data

US 2021/0357147 A1 Nov. 18, 2021

(51) Int. Cl.
*G06F 3/00* (2006.01)
*G06F 3/06* (2006.01)
(Continued)

(52) U.S. Cl.
CPC .......... *G06F 3/0659* (2013.01); *G06F 3/0608* (2013.01); *G06F 3/0619* (2013.01); *G06F 3/0643* (2013.01); *G06F 3/0644* (2013.01); *G06F 3/0656* (2013.01); *G06F 3/0673* (2013.01); *G06F 11/1004* (2013.01); *G06F 11/1044* (2013.01); *G06F 21/602* (2013.01)

(58) Field of Classification Search
CPC .... G06F 3/0659; G06F 3/0608; G06F 3/0619; G06F 3/0643; G06F 3/0644; G06F 3/0656; G06F 3/0673; G06F 11/1004; G06F 11/1044; G06F 21/602
See application file for complete search history.

(56) References Cited

U.S. PATENT DOCUMENTS 3,893,071 A 7/1975 Bossen
4,562,494 A 12/1985 Bond
(Continued)

FOREIGN PATENT DOCUMENTS

JP 2003022209 1/2003
JP 2011175422 9/2011
(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).
(Continued)

*Primary Examiner* — Tammara R Peyton
(74) *Attorney, Agent, or Firm* — Shun Yao; Yao Legal Services, Inc.

(57) ABSTRACT

A system is provided to receive a request to write data to a storage device, wherein the data is associated with a file name and a file path. The system performs a hash function on an input based on the file name and the file path to obtain a hash value, wherein the hash function comprises a plurality of hash methods performed on the input. The system maps the hash value to a physical location in the storage device, and writes the data to the physical location in the storage device.

16 Claims, 9 Drawing Sheets

(51) Int. Cl.
    *G06F 21/60*    (2013.01)
    *G06F 11/10*    (2006.01)

(56) References Cited

U.S. PATENT DOCUMENTS

| | | |
|---|---|---|
| 4,718,067 A | 1/1988 | Peters |
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,715,471 A | 2/1998 | Otsuka |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,243,795 B1 | 6/2001 | Yang |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,819,367 B1 | 8/2014 | Fallone |
| 8,825,937 B2 | 9/2014 | Atkisson |
| 8,832,688 B2 | 9/2014 | Tang |
| 8,868,825 B1 | 10/2014 | Hayes |
| 8,874,842 B1 * | 10/2014 | Kimmel .................. G06F 3/064 711/100 |
| 8,904,061 B1 | 12/2014 | O'Brien, III |
| 8,949,208 B1 | 2/2015 | Xu |
| 9,015,561 B1 | 4/2015 | Hu |
| 9,031,296 B2 | 5/2015 | Kaempfer |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,213,627 B2 | 12/2015 | Van Acht |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,495,263 B2 | 11/2016 | Pang |
| 9,529,601 B1 | 12/2016 | Dharmadhikari |
| 9,529,670 B2 | 12/2016 | O'Connor |
| 9,575,982 B1 | 2/2017 | Sankara Subramanian |
| 9,588,698 B1 | 3/2017 | Karamcheti |
| 9,588,977 B1 | 3/2017 | Wang |
| 9,607,631 B2 | 3/2017 | Rausch |
| 9,671,971 B2 | 6/2017 | Trika |
| 9,747,202 B1 | 8/2017 | Shaharabany |
| 9,852,076 B1 | 12/2017 | Garg |
| 9,875,053 B2 | 1/2018 | Frid |
| 9,912,530 B2 | 3/2018 | Singatwaria |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,268,390 B2 | 4/2019 | Warfield |
| 10,318,467 B2 | 6/2019 | Barzik |
| 10,361,722 B2 | 7/2019 | Lee |
| 10,437,670 B1 | 10/2019 | Koltsidas |
| 10,459,663 B2 | 10/2019 | Agombar |
| 10,642,522 B2 | 5/2020 | Li |
| 10,649,657 B2 | 5/2020 | Zaidman |
| 10,678,432 B1 | 6/2020 | Dreier |
| 10,756,816 B1 | 8/2020 | Dreier |
| 10,884,947 B2 * | 1/2021 | Bhatia .................. G06F 12/0246 |
| 10,928,847 B2 | 2/2021 | Suresh |
| 2001/0032324 A1 | 10/2001 | Slaughter |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0112085 A1 | 8/2002 | Berg |
| 2002/0161890 A1 | 10/2002 | Chen |
| 2003/0074319 A1 | 4/2003 | Jaquette |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0143718 A1 | 7/2004 | Chen |
| 2004/0255171 A1 | 12/2004 | Zimmer |
| 2004/0267752 A1 | 12/2004 | Wong |
| 2004/0268278 A1 | 12/2004 | Hoberman |
| 2005/0038954 A1 | 2/2005 | Saliba |
| 2005/0097126 A1 | 5/2005 | Cabrera |
| 2005/0138325 A1 | 6/2005 | Hofstee |
| 2005/0144358 A1 | 6/2005 | Conley |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0101197 A1 | 5/2006 | Georgis |
| 2006/0156012 A1 | 7/2006 | Beeson |
| 2006/0184813 A1 | 8/2006 | Bui |
| 2007/0033323 A1 | 2/2007 | Gorobets |
| 2007/0061502 A1 | 3/2007 | Lasser |
| 2007/0101096 A1 | 5/2007 | Gorobets |
| 2007/0250756 A1 | 10/2007 | Gower |
| 2007/0266011 A1 | 11/2007 | Rohrs |
| 2007/0283081 A1 | 12/2007 | Lasser |
| 2007/0283104 A1 | 12/2007 | Wellwood |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0163033 A1 | 7/2008 | Yim |
| 2008/0301532 A1 | 12/2008 | Uchikawa |
| 2009/0006667 A1 | 1/2009 | Lin |
| 2009/0089544 A1 | 4/2009 | Liu |
| 2009/0113219 A1 | 4/2009 | Aharonov |
| 2009/0125788 A1 | 5/2009 | Wheeler |
| 2009/0183052 A1 | 7/2009 | Kanno |
| 2009/0254705 A1 | 10/2009 | Abali |
| 2009/0282275 A1 | 11/2009 | Yermalayeu |
| 2009/0287956 A1 | 11/2009 | Flynn |
| 2009/0307249 A1 | 12/2009 | Koifman |
| 2009/0307426 A1 | 12/2009 | Galloway |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |

(56) References Cited

U.S. PATENT DOCUMENTS

| | | |
|---|---|---|
| 2011/0055471 A1 | 3/2011 | Thatcher |
| 2011/0060722 A1 | 3/2011 | Li |
| 2011/0072204 A1 | 3/2011 | Chang |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | McWilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | Antonio |
| 2013/0254622 A1 | 9/2013 | Kanno |
| 2013/0318283 A1 | 11/2013 | Small |
| 2013/0318395 A1 | 11/2013 | Kalavade |
| 2013/0329492 A1 | 12/2013 | Yang |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0082412 A1 | 3/2014 | Matsumura |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0132237 A1 | 5/2016 | Jeong |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161202 A1 | 6/2017 | Erez |

(56) References Cited

U.S. PATENT DOCUMENTS

| | | |
|---|---|---|
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Jung |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0317901 A1 | 10/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0089430 A1 | 3/2020 | Kanno |
| 2020/0097189 A1 | 3/2020 | Tao |
| 2020/0143885 A1 | 5/2020 | Kim |
| 2020/0159425 A1 | 5/2020 | Flynn |
| 2020/0167091 A1 | 5/2020 | Haridas |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0326855 A1 | 10/2020 | Wu |
| 2020/0328192 A1 | 10/2020 | Zaman |
| 2020/0348888 A1 | 11/2020 | Kim |
| 2020/0387327 A1 | 12/2020 | Hsieh |
| 2020/0401334 A1 | 12/2020 | Saxena |
| 2020/0409791 A1 | 12/2020 | Devriendt |
| 2021/0010338 A1 | 1/2021 | Santos |
| 2021/0089392 A1 | 3/2021 | Shirakawa |
| 2021/0103388 A1 | 4/2021 | Choi |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices" < FAST'11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime," Design, Automation & Text in Europe Conference & Exhibition (Date), 2013.

(56) References Cited

OTHER PUBLICATIONS

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.
C. Wu, D. Wu, H. Chou and C. Cheng, "Rethink the Design of Flash Translation Layers in a Component-Based View", in IEEE Acess, vol. 5, pp. 12895-12912, 2017.
Po-Liang Wu, Yuan-Hao Chang and T. Kuo, "A file-system-aware FTL design for flash-memory storage systems," 2009, pp. 393-398.
S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.
A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.
J. Jung and Y. Won, "nvramdisk: A Transactional Block Device Driver for Non-Volatile RAM", in IEEE Transactions on Computers, vol. 65, No. 2, pp. 589-600, Feb. 1, 2016.
Te I et al. (Pensieve: a Machine Assisted SSD Layer for Extending the Lifetime: (Year: 2018).
ARM ("Cortex-R5 and Cortex-R5F", Technical reference Manual, Revision r1p1) (Year:2011).

\* cited by examiner

SYSTEM METHOD FOR FACILITATING MEMORY MEDIA AS FILE STORAGE DEVICE BASED ON REAL-TIME HASHING BY PERFORMING INTEGRITY CHECK WITH A CYCLICAL REDUNDANCY CHECK (CRC)

BACKGROUND

Field

This disclosure is generally related to the field of data storage. More specifically, this disclosure is related to a method and system for facilitating memory media as a file storage device based on real-time hashing.

Related Art

Today, various storage systems are being used to store and access the ever-increasing amount of digital content. A storage system can include storage servers with one or more storage devices or drives, and a storage device or drive can include storage media with persistent memory, i.e., a non-volatile memory. Some types of persistent memory are developing and emerging with increased maturity in characteristics such as yield, cost, stability, and density, such as magenetoresistive random-access memory (MRAM), phase change memory (PCM), and resistive RAM (ReRAM) (i.e., "emerging memory media"). While fabrication of this emerging memory media is increasing, challenges remain in integrating this storage media into a hyperscale infrastructure.

At the same time, conventional storage devices such as NAND-flash based solid state drives (SSDs) inherit the legacy of older storage devices such as hard disk drives (HDDs). These conventional storage devices can be associated with performance and reliability challenges during deployment due to a bulky input/output (I/O) stack. Because of the issues in integrating the emerging memory media, as well as the challenge of pairing NAND flash-based SSDs with HDDs, the usage of NAND flash can suffer from sub-optimal utilization.

One current solution involves a storage hierarchy in which an additional layer is inserted between a non-volatile memory express (NVMe) SSD and the system memory (e.g., dynamic random-access memory (DRAM)). This additional layer (or middle tier) can be a 3D Xpoint (3DXP)-based SSD, and can be used as a write cache to improve the performance associated with a write operation. However, this current solution is limited by several factors, including: the bulky I/O stack involves multiple layers; the NVMe SSD communicates with the other tiers based on the NVMe protocol and may not be compatible with the emerging memory media; and inserting additional layers between the NVMe SSD and the system DRAM can result in additional complexity given the increased data movement and hardware/software management.

Thus, while conventional SSDs may provide storage (NVMe SSDs) and serve as a middle tier write cache (Optane SSDs), challenges remain in optimizing SSDs and efficiently integrating emerging memory media in current storage systems.

SUMMARY

One embodiment provides a system which facilitates operation of a storage system. The system receives a request to write data to a storage device, wherein the data is associated with a file name and a file path. The system performs a hash function on an input based on the file name and the file path to obtain a hash value, wherein the hash function comprises a plurality of hash methods performed on the input. The system maps the hash value to a physical location in the storage device, and writes the data to the physical location in the storage device.

In some embodiments, the request is received by a controller of the storage device from a host.

In some embodiments, the host performs one or more of the following functions: mapping files to physical locations, including mapping the hash value to the physical location; allocating physical space in the storage device; freeing physical space in the storage device; defragmenting data; performing a data refresh or a data scrub operation; determining where to place a file; performing a data merge or a data flush operation; providing assurance for data persistency; and providing protection during a power loss.

In some embodiments, the controller performs one or more of the following functions: providing a characterization or other information related to a non-volatile memory of the storage device; providing a media interface to storage media of the storage device; performing an error correction code (ECC) encoding or decoding on data; performing a data recovery method; performing an integrity check, including a cyclical redundancy check (CRC); encrypting or decrypting data; and processing data which requires an intensity which is greater than a predetermined threshold.

In some embodiments, the hash value comprises an index for an entry in a mapping table, the mapping table is sorted in an ascending order based on the hash value as the index, and the physical location in the mapping table indicates an offset and a length corresponding to the data.

In some embodiments, the system receives a request to read the data previously written to the physical location in the storage device, wherein the read request indicates a requested file name and a requested file path. The system performs the hash function on a second input based on the requested file name and the requested file path to obtain a calculated hash value. The system performs, in a mapping table, a search based on the calculated hash value to obtain an entry which maps the hash value to the physical location. The system reads the data from the physical location based on the offset and the length.

In some embodiments, the data is stored as a first and only file in a physical unit of a non-volatile memory of the storage device. Responsive to detecting a condition, the system pads data to the first file until the physical unit is full.

In some embodiments, the system reads the data from the physical location based on the offset and the length by: the system reads a physical unit associated with the physical location based on the offset to obtain a full unit of data; the system drops the padded data from the full unit of data to obtain the first file; and the system returns, to a requesting host, the obtained first file.

In some embodiments, the data is stored as a first file in a physical unit of a non-volatile memory of the storage device with at least a second file. The system stores the first file and at least the second file based on a format which includes one or more of a pre-amble, content of the data, metadata corresponding to a header for the content, parity information for the data, and a post-amble. The system encodes the stored first file and at least the second file based on an error correction code (ECC) to obtain parity bits corresponding to the stored first file and at least the second file. The system stores the parity bits in the physical unit appended to the stored first file and at least the second file.

In some embodiments, the system reads the data from the physical location based on the offset and the length by: the system reads data from a physical unit associated with the physical location based on the offset to obtain a full unit of data, wherein the full unit of data includes the stored first file and at least the second file and the corresponding parity bits; the system decodes, based on the error correction code, the full unit of data to obtain ECC-decoded data; the system identifies, in the obtained ECC-decoded data, the first file based on a pre-amble and a post-amble stored as part of the first file; the system drops a remaining portion of the full unit of data; and the system returns, to a requesting host, the identified first file.

BRIEF DESCRIPTION OF THE FIGURES

In the figures, like reference numerals refer to the same figure elements.

DETAILED DESCRIPTION

Figure 1:
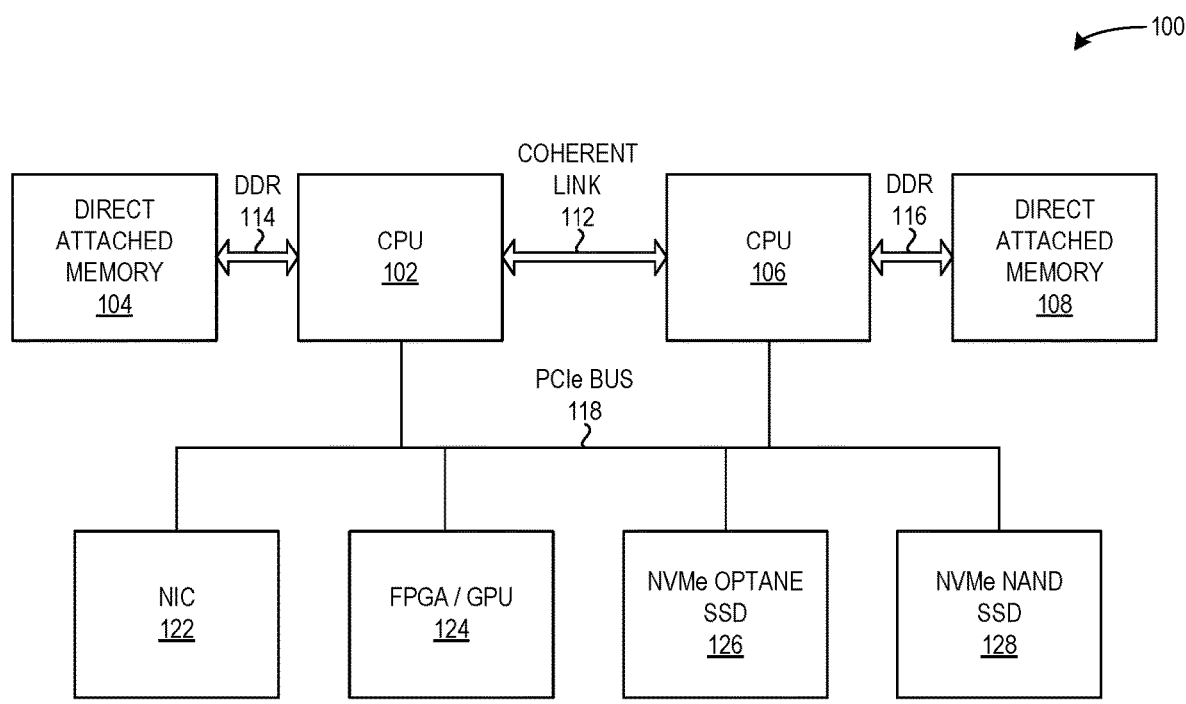
FIG. 1 illustrates an exemplary environment which facilitates operation of a storage system, including a middle tier as a write cache, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a storage system which facilitates emerging memory media as a file storage device which can serve as the main storage rather than as an intermediate cache layer.

As described above, emerging memory media such as MRAM, PCM, and ReRAM is developing at an increased pace. While fabrication of this emerging memory media is increasing, challenge remain in integrating this storage media into a hyperscale infrastructure. At the same time, conventional storage devices such as NAND-flash based SSDs inherit the legacy of older storage devices such as HDDs. These conventional storage devices can be associated with performance and reliability challenges during deployment due to a bulky input/output (I/O) stack. Because of the issues in integrating the emerging memory media, as well as the challenge of pairing NAND flash-based SSDs with HDDs, the usage of NAND flash can suffer from sub-optimal utilization.

One current solution involves a storage hierarchy in which an additional layer is inserted between an NVMe SSD and the system memory (DRAM). This additional layer (or middle tier) can be a 3DXP-based SSD, and can be used as a write cache to improve the performance associated with a write operation. However, this current solution is limited by several factors, including: the bulky I/O stack involves multiple layers; the NVMe SSD communicates with the other tiers based on the NVMe protocol and may not be compatible with the emerging memory media; and inserting additional layers between the NVMe SSD and the system DRAM can result in additional complexity given the increased data movement and hardware/software management. An exemplary current solution is described below in relation to FIG. 1.

The embodiments described herein provide a system which addresses the challenges associated with the prior art systems and which facilitates the emerging memory media as a file storage device which can serve as the main storage instead of as an intermediate cache. The file storage device can connect onto an existing Peripheral Component Interconnect Express (PCIe) bus, and can use the PCIe physical layer and electrical supports. The transfer protocol of this file storage device can be different than with the existing NVMe SSDs. The described embodiments provide the software and hardware components of the file storage device. An exemplary file storage device as integrated into a storage system is described below in relation to FIG. 2.

Specifically, the file storage device can work with the host in a collaborative manner in the storage system. A driver on the host side can run on a central processing unit (CPU), while system memory (DRAM) can provide management operations, e.g., data placement, metadata maintenance, and address mapping. A controller in the file storage device can provide a media interface and handle data-intensive processing, e.g., error correction coding, encryption, integrity checking, and media handling. An exemplary architecture of a storage system with the file storage device is described below in relation to FIG. 3.

Furthermore, the described embodiments can use a mapping between a file and physical units of the non-volatile memory of the file storage device. The mapping can be based on a hash function performed on a string which includes the file name and the file path. This hash function can be a concatenation of multiple hash algorithms, which can reduce the likelihood of a hash collision. The system can also store a data file in the file storage device based on the size of the data file. An exemplary mapping is described below in relation to FIG. 4. An exemplary data placement (i.e., a write operation) is described below in relation to FIGS. 5A and 6A, while an exemplary read operation is described below in relation to FIGS. 5B and 6B.

Thus, by separating the control plane from the data plane, and determining file placement due based on a real-time hash calculation, the embodiments described herein can provide a light-weight I/O stack with transparency, reliability, and a decreased operational complexity. The file storage device of the described embodiments can serve as the main storage instead of as an intermediate cache layer, and can further provide an efficient replacement for the conventional NVMe Optane SSD and the NVMe NAND SSD.

A "distributed storage system" or a "storage system" can include multiple storage servers. A "non-volatile storage system" can include non-volatile memory. A "storage server" or a "storage system" can refer to a computing device which can include multiple storage devices or storage drives. A "storage device" or a "storage drive" refers to a device or a drive with a non-volatile memory which can provide persistent storage of data, e.g., a solid state drive (SSD), a hard disk drive (HDD), an MRAM-based storage device, a PCM-based storage device, a ReRAM-based storage device, or a flash-based storage device. A storage system can also be a computer system.

"Persistent memory" refers to storage media which may be used for persistent storage of data, e.g., MRAM, PCM, ReRAM, NAND, HDD, SSD, etc. The term "emerging persistent memory" or "emerging memory media" as used in this disclosure refers to, e.g., MRAM, PCM, and ReRAM.

A "computing device" refers to any server, device, node, entity, drive, or any other entity which can provide any computing capabilities.

A "physical unit" refers to a unit into which a memory media can be formatted, as multiple equal-length physical units of, e.g., 128 Bytes per unit.

Exemplary Operation of a Storage System in the Prior Art

FIG. 1 illustrates an exemplary environment 100 which facilitates operation of a storage system, including a middle tier as a write cache, in accordance with the prior art. Environment 100 can include: a central processing unit (CPU) 102 and a direct attached memory 104 accessed via a double data rate (DDR) protocol 114; a CPU 106 and a direct attached memory 108 accessed via a DDR protocol 116; a network interface card (NIC) 122; a field programmable gate array (FPGA)/general processing unit (GPU) 124; a non-volatile memory express (NVMe) Optane SSD 126; and a NVMe NAND SSD 128. Direct attached memory 104 and 108 can be system memory such as DRAM. CPUs 102 and 106 can communicate with each other via a coherent link 112. CPUs 102 and 106 can also communicate with NIC 122, FPGA/GPU 124, Optane SSD 126, and NAND SSD 128 via a PCIe bus 118.

In the storage hierarchy of environment 100, Optane SSD 126 can be an additional layer which is inserted between NAND SSD 128 and system memory 104 and 108. Optane SSD 126 can be used as a write cache, and may provide a latency lower than that of NAND SSD 128. Note that Optane SSD 126, e.g., with 3D XPoint storage media, is used for illustrative purposes as the inserted additional layer. Other types of storage media may be used as the inserted additional layer, such as the LL-NAND from Samsung.

While Optane SSD with the 3DXP storage media may be associated with a latency less than 1 microsecond (us), environment 100 still uses the NVMe protocol which may be associated with a latency greater than 6 us. When NAND SSD 128 integrates the internal system memory within the storage drive, the different in latency between Optane SSD 126 and NAND SSD 128 may be too close to provide a clear efficiency or improvement.

In addition to this shortcoming in latency, prior art environment 100 is also limited by several other factors. First, Optane SSD 126 uses a bulky I/O stack, which passes through multiple layers and can result in sub-optimal management of the storage device, the storage server, and the overall storage system. Second, NAND SSD 128 communicates with other entities and tiers in the storage system via an NVMe protocol, and this protocol may not be compatible with emerging memory media. Third, inserting additional layers between NAND SSD 128 and system memory 104 and 108 can result in additional complexity due to increased data movement and hardware/software management.

Thus, prior art environment 100 may be limited in optimizing the usage of emerging memory media.

Figure 2:
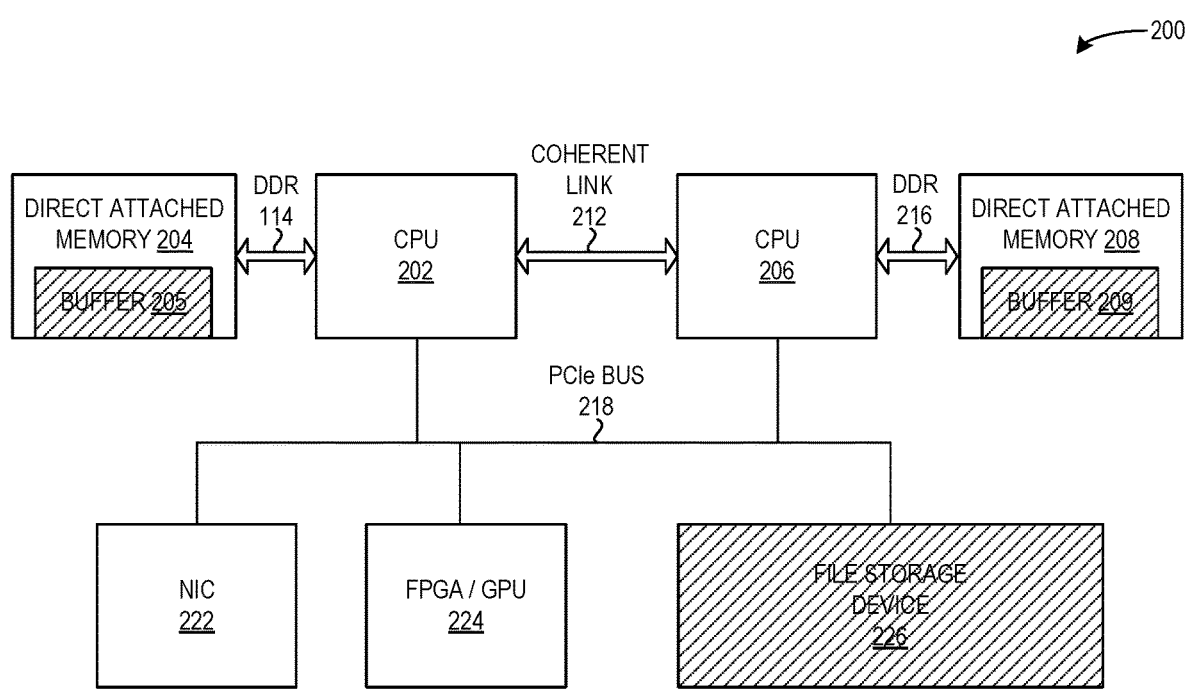
FIG. 2 illustrates an exemplary environment which facilitates operation of a storage system, including a file storage device collaborating with the host CPU and system memory, in accordance with an embodiment of the present application.

Exemplary Environment Including a File Storage Device Collaborating with the Host CPU and System Memory; Exemplary Functions Performed by Host and File Storage Device FIG. 2 illustrates an exemplary environment 200 which facilitates operation of a storage system, including a file storage device collaborating with the host CPU and system memory, in accordance with an embodiment of the present application. Environment 200 can include: a CPU 202 and a direct attached memory 204 accessed via a double data rate (DDR) protocol 214; a CPU 206 and a direct attached memory 208 accessed via a DDR protocol 216; a NIC 222; an FPGA/GPU 224; and a file storage device 226. Direct attached memory 204 can be system memory such as DRAM, and can include a buffer 205. Direct attached memory 208 can be system memory such as DRAM, and can include a buffer 209. CPUs 202 and 206 can communicate with each other via a coherent link 212. CPUs 202 and 206 can also communicate with NIC 222, FPGA/GPU 224, and file storage device 226 via a PCIe bus 218.

In environment 200, file storage device 226 can serve as the main storage rather than as an intermediate cache layer (as in Optane SSD 126 of prior art environment 100). File storage device 226 can connect onto existing PCIe bus 218, and can further use the PCIe physical layer and electrical supports. The file storage device can include software and hardware components which together provide the functionality described herein. Exemplary functions are described below in relation to FIG. 3.

Figure 3:
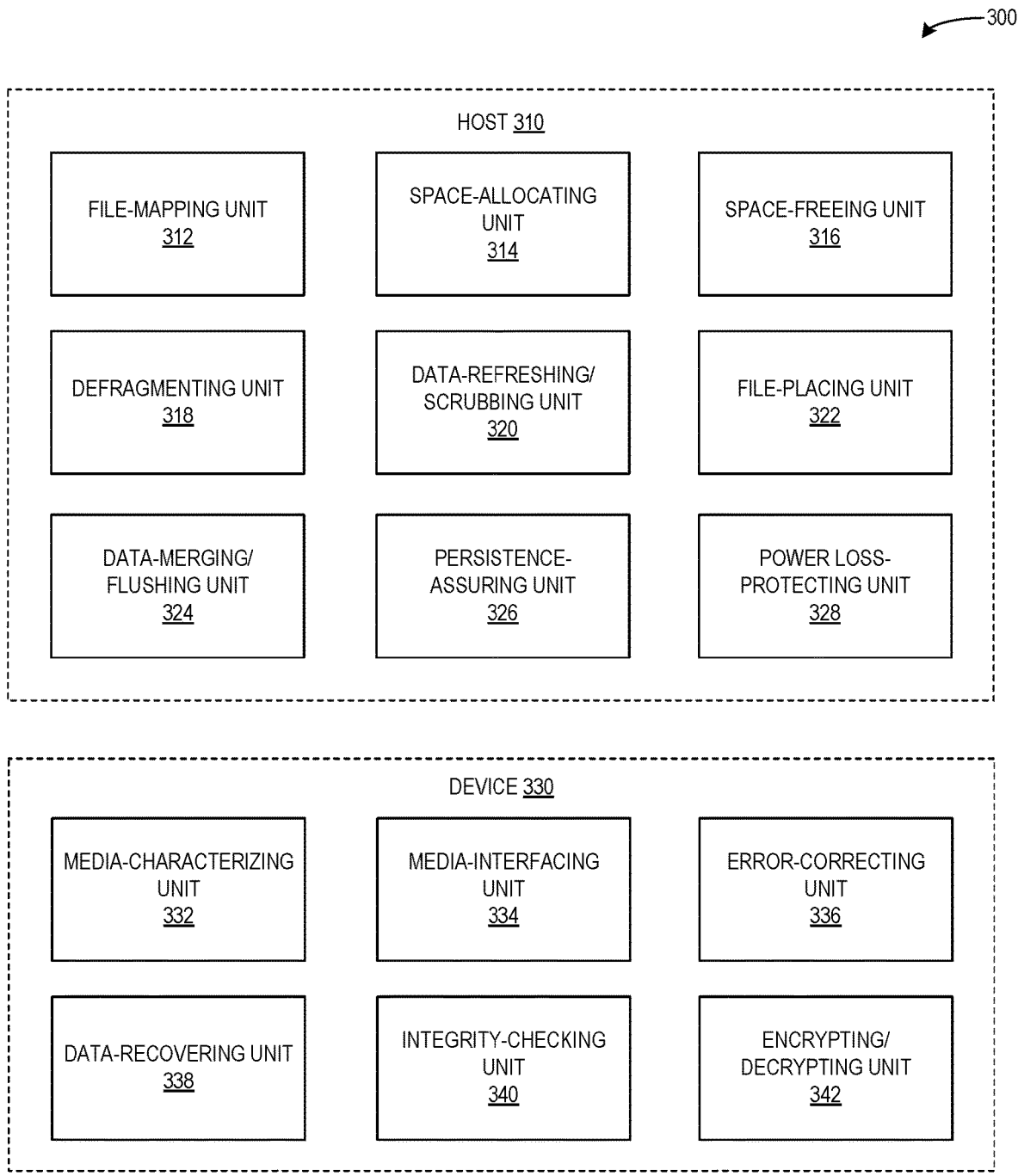
FIG. 3 illustrates functions performed by a host and a file storage device, in accordance with an embodiment of the present application.

FIG. 3 illustrates functions 300 performed by a host 310 and a file storage device 330, in accordance with an embodiment of the present application. Host 310 can include one or more of: a file-mapping unit 312, for mapping files to physical locations, including mapping the hash value to the physical location; a space-allocating unit 314, for allocating physical space in the storage device; a space-freeing unit 316, for freeing physical space in the storage device; a defragmenting unit 318; a data-refreshing/scrubbing unit 320; a file-placing unit 322, for determining where to place a file; a data-merging/flushing unit 324; a persistence-assuring unit 326; and a power loss-protecting unit 328.

Device 330 can include one or more of: a media-characterizing unit 332, for providing a characterization or other information related to a non-volatile memory of the storage device; a media-interfacing unit 334, for providing a media interface to storage media of the storage device; an error-correcting unit 336, for performing an error correction code (ECC) encoding or decoding on data; a data-recovering unit 338, for performing a data recovery method; an integrity-checking unit 340, for performing an integrity check, including a cyclical redundancy check (CRC); an encrypting/decrypting unit 342; and a data-processing unit (not shown), for processing data which requires an intensity greater than a predetermined threshold.

Data can be stored in a file storage device (such as file storage device 226 of FIG. 2) based on physical units in the memory media, where the physical units are formatted into equal-length units (e.g., 128 Bytes per unit) (file-placing unit 322). If the size of an incoming file is greater than the size of a physical unit, the system can allocate the least integer number of physical units to store the incoming file (space-allocating unit 314). Accordingly, a ceiling function of a real number x can be represented as ceil(file size/unit length), which is equal to the number of allocated physical units. When the system deletes a single file, the system can immediately release the corresponding physical units (space-freeing unit 316). The system can also collect the random discrete physical units (defragmenting unit 318) to perform data merging and flushing operations (data-merging/flushing unit 324), e.g., of contiguous physical units based upon detecting the passage of a predetermined period of time or inactivity. The system can store data (file-placing unit 322), and can also maintain the file organization and directory hierarchy (file-mapping unit 312).

Note that part of host memory can be used as the data buffer for data merging (e.g., data buffer 205 of DRAM 204 and data buffer 209 of DRAM 208 as depicted in FIG. 2). If the size of the incoming file is less than the size of a physical unit, the system can temporarily store the incoming file in a data buffer of DRAM, to be flushed at a later time into the file storage device (data-merging/flushing unit 324). The system can handle a loss of power by enforcing the data consistency and persistency (persistence-assuring unit 326 collaborating with power loss-protecting unit 328). Furthermore, due to the large equivalent parasitic capacitor generally used in a server, such as a motherboard, power unit, etc., the charge held in that large capacitor can generally provide sufficient power to flush data from the buffer to the persistent memory. The storage system thus need no use or equip an additional super capacitor for the file storage device of FIG. 2. For example, power loss-protecting unit 328 can also provide sufficient power for flushing the data in the DRAM buffer to the non-volatile memory of the file storage device of FIG. 2. When the system detects a loss of power, the system can use the residual charge in the parasitic capacitors, which residual charge can last, e.g., tens of microseconds at a sufficient or suitable voltage level.

Thus, in contrast with a device controller in an Optane SSD (or other middle-tier storage non-volatile memory storage device used as a cache layer in a storage system), the system of FIGS. 2 and 3 depict how the system can implement the typically complicated management using host resources, which can result in enhancing the transparency, reliability, and low latency of the operation.

Figure 4:
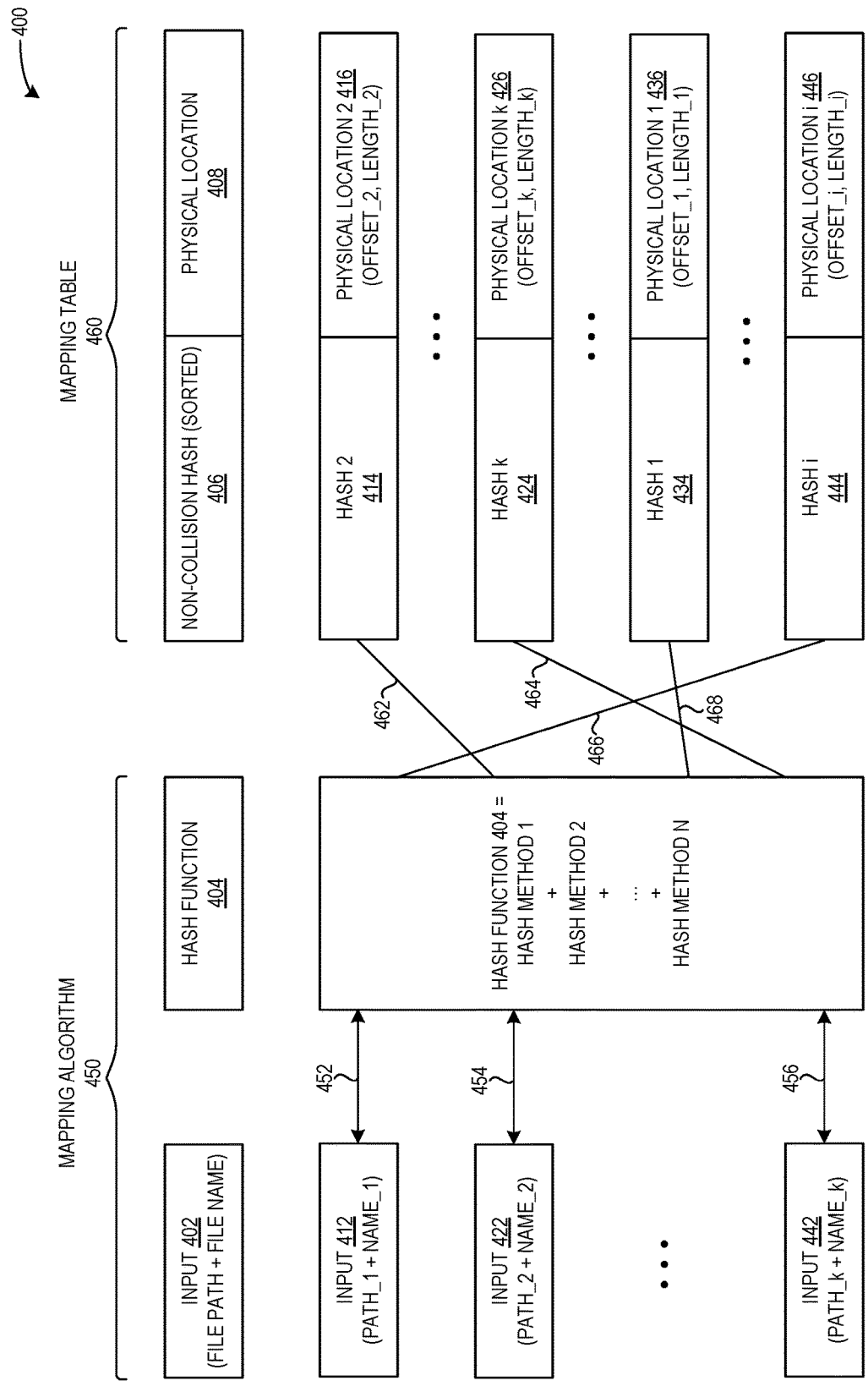
FIG. 4 illustrates an exemplary mapping between a file and the physical units of the non-volatile memory of a file storage device, including a mapping table, in accordance with an embodiment of the present application.

Exemplary Mapping Between a File and the Physical Units of the File Storage Device FIG. 4 illustrates an exemplary mapping 400 between a file and the physical units of the non-volatile memory of a file storage device, including a mapping table, in accordance with an embodiment of the present application. Exemplary mapping 400 can include a mapping algorithm 450 and a mapping table 460. The system can take as an input 402 to a hash function 404, a string which is the file path concatenated with the file name, to obtain a final hash value. The string can also be the file name concatenated with the file path. That is, either the file name or the file path can be ordered first in the string. Hash function 404 can include a plurality of distinct hash methods performed on the input, where the final hash value is a concatenation of the hash results of each distinct hash method performed on the input. Hash function 404 can control the probability of a hash collision below an extremely low value (e.g., below a predetermined threshold, or below a predetermined tolerable level).

Subsequently, the system can store each final hash value corresponding to a unique input (e.g., file) in mapping table 460, where the final hash value is stored as a non-collision hash 406. Each final hash value corresponding to a unique input (e.g., a file) can be sorted in an ascending order and further mapped to a physical location 408 in the non-volatile memory. The physical location can be identified based the start index of a physical unit (i.e., the offset) and the number of physical units occupied (i.e., the length). In some embodiments, the length can indicate the actual length of a respective data file, and the system can use the length along with the offset to determine a number of physical units occupied by the file, where a physical unit is of a certain predetermined size.

For example, the system can receive a first file, which is indicated as an input 412 (with a corresponding input string of "path_1+name_1"). The system can perform hash function 404 on input 412, e.g., by performing each of a hash method 1, a hash method 2, and a hash method n on input 412, and concatenating the resulting hash values from each of these hash methods, to obtain a final hash value of "hash 1." Similarly, an input 422 (with a corresponding input string of "path_2+name_2") can result in a final hash value of "hash 2," and an input 442 (with a corresponding input string of "path_k+name_k") can result in a final hash value of "hash k."

The system can store each of the resulting hash values in an entry of mapping table 460, and can further map each resulting hash value to a physical location in the non-volatile memory. The physical location can be identified based on the start index of a physical unit (i.e., the offset) and the number of physical units occupied (i.e., the length).

The system can also sort, in an ascending order in mapping table 460, entries by using the hash values as the index. For example, the system can store in mapping table 460 an entry for hash 1 434 with a physical location 1 436 (of "offset_1, length_1") (via an operation 468). The system can store an entry for hash 2 414 with a physical location 2 416 (of "offset_2, length_2") (via an operation 462). The system can store an entry for hash i 444 with a physical location i 436 (of "offset_i, length_i") (via an operation 466). The system can store an entry for hash k 424 with a physical location k 426 (of "offset_k, length_k") (via an operation 464).

During a read operation, the system can perform a live or real-time hash calculation based on the file name and file path of the requested data to obtain a "real-time hash value" or a dynamically calculated hash value. The system can search the mapping table, based on this real-time hash value, to obtain the corresponding entry, i.e., an entry in which the stored hash value (used as the index for the entry) matches the real-time hash value. The system can also store the metadata associated with the data, including the directory, file name, and hierarchy information. This metadata can be stored persistently, and can be loaded upon initiation of the file storage device and the storage system. An exemplary format for storing data, including the metadata, is described below in relation to FIGS. 5A and 5B.

Exemplary Data Placement (Write Operation)

Figure 5A:
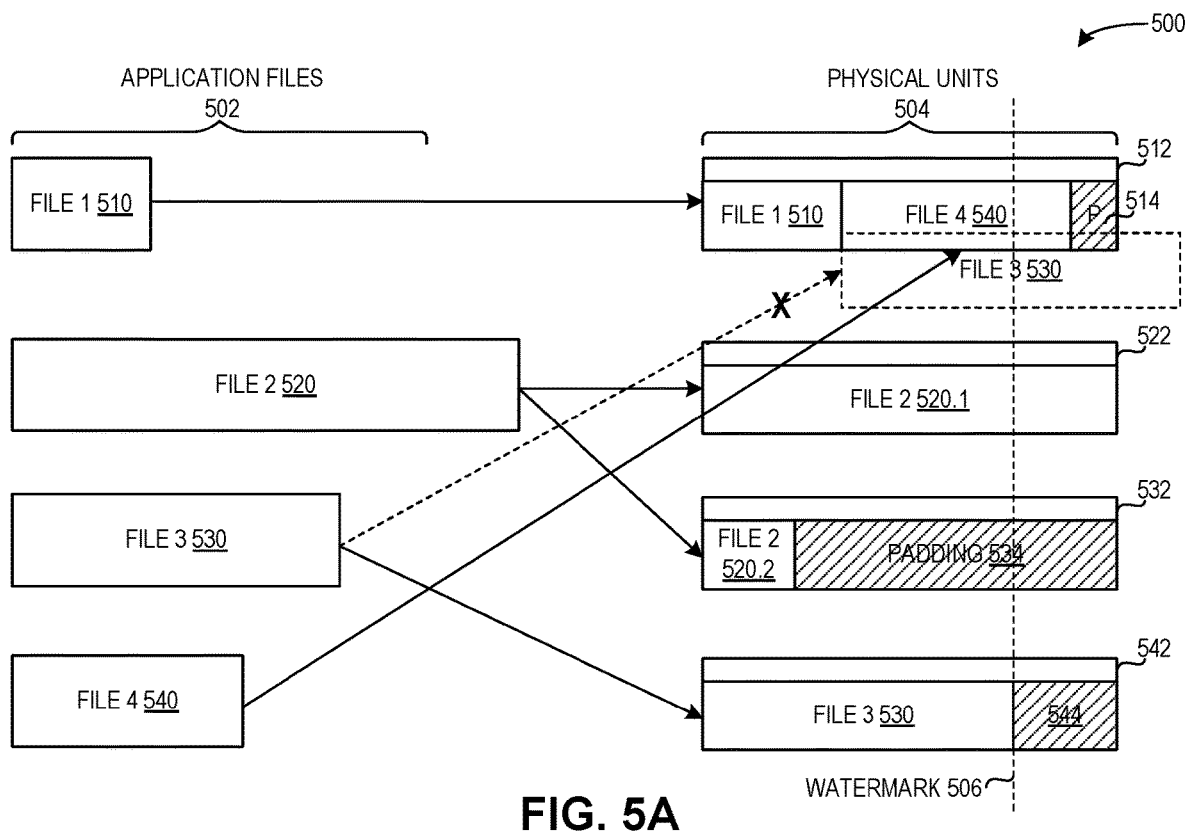
FIG. 5A illustrates an exemplary data placement (i.e., a write operation), in accordance with an embodiment of the present application.

FIG. 5A illustrates an exemplary data placement 500 (i.e., a write operation), in accordance with an embodiment of the present application. Data placement 500 can include application files 502 and physical units 504. Application files 502 can include: a file 1 510; a file 2 520; a file 3 530; and a file 4 540. Physical units 504 can include physical units 512, 522, 532, and 542. If the size of a file is less than the size available of an open physical unit ("small file"), the system will write the small file to the open physical unit. The system can hold this small file in the buffer of host memory and wait to merge the small file with other incoming small file(s).

If the size of a file is greater than the size available of an open physical unit ("large file"), the system will write the large file to multiple unfilled open physical units, e.g., a first portion to an unfilled open physical unit, and the remaining portion or portions to other unfilled open physical units. The system can subsequently pad any remaining empty portion in a last open physical unit with dummy data.

The system can set a "watermark" in each physical unit. The watermark can be a predetermined or user-configured threshold used to evaluate whether a small file is to be merged into an open physical unit, or placed in a different open physical unit. The system does not allow merging small files whose cumulative size ("merged file size") is greater than the size of a physical unit. That is, the system only places more than one small file in a physical unit if the cumulative size or merged file size falls between the watermark and the size of the physical unit.

For example, the system determines that the size of file 1 510 is less than the size of a physical unit, and places file 1 510 into physical unit 512. The system determines that the size of file 2 520 is greater than the size of a physical unit, and places file 2 520 into multiple unfilled physical units, with a first portion 520.1 placed in physical unit 522 and a second portion 520.2 placed in physical unit 532. The system determines that the size of file 3 530 merged with file 1 510 in physical unit 512 results in a merged file size which is greater than the size of physical unit 512 (indicated by the dashed line and a bold "X"), and thus places file 3 530 in an unfilled physical unit 542. The system determines that the size of file 4 540 merged with file 1 510 in physical unit 512 results in a merged file size which falls between a watermark 506 and the size of physical unit 512, and thus places file 4 540 in physical unit 512.

The system can pad the remaining empty or unfilled portion of the physical units based on detecting a condition, e.g.: a passage or reaching of a predetermined time period or interval (i.e., determining no further incoming data for a predetermined period of time); determining that the total file size (or merged file size) of data in a respective physical unit falls between the watermark and the size of the respective physical unit; and a condition, rule, or algorithm which is based on time, a watermark, size of one or more files in a respective physical unit or other predetermined threshold.

For example, based on one of the above described conditions, the system can pad the empty portion of physical unit 512 with padding bits or dummy data 514. Similarly, the system can pad the empty portion of physical unit 532 with padding bits or dummy data 534, and can also pad the empty portion of physical unit 542 with padding bits or dummy data 544. The dummy data or padding bits can include a dummy pattern.

Each file corresponds to a unique hash value (as indicated by non-collision hash 406 of FIG. 4), but multiple files can share the same physical location, i.e., be placed in the same physical unit and thus share the same offset and same length. Recall that the length indicates the number of physical units occupied by a file, rather than the length of the actual data or file itself. For example, in data placement 500, file 1 510 and file 5 450 are both stored in the same physical unit 512 (as multiple merged files), and because the unit of offset and length indicates the physical unit, the multiple merged files share the same physical location. That is, the physical location stored in each respective entry in the mapping table is the same. In order to retrieve the individual small file from among the multiple merged files in a same physical unit, the system can use a specific format for the data stored in a single physical unit, as described below in relation to FIG. 5B.

Figure 5B:
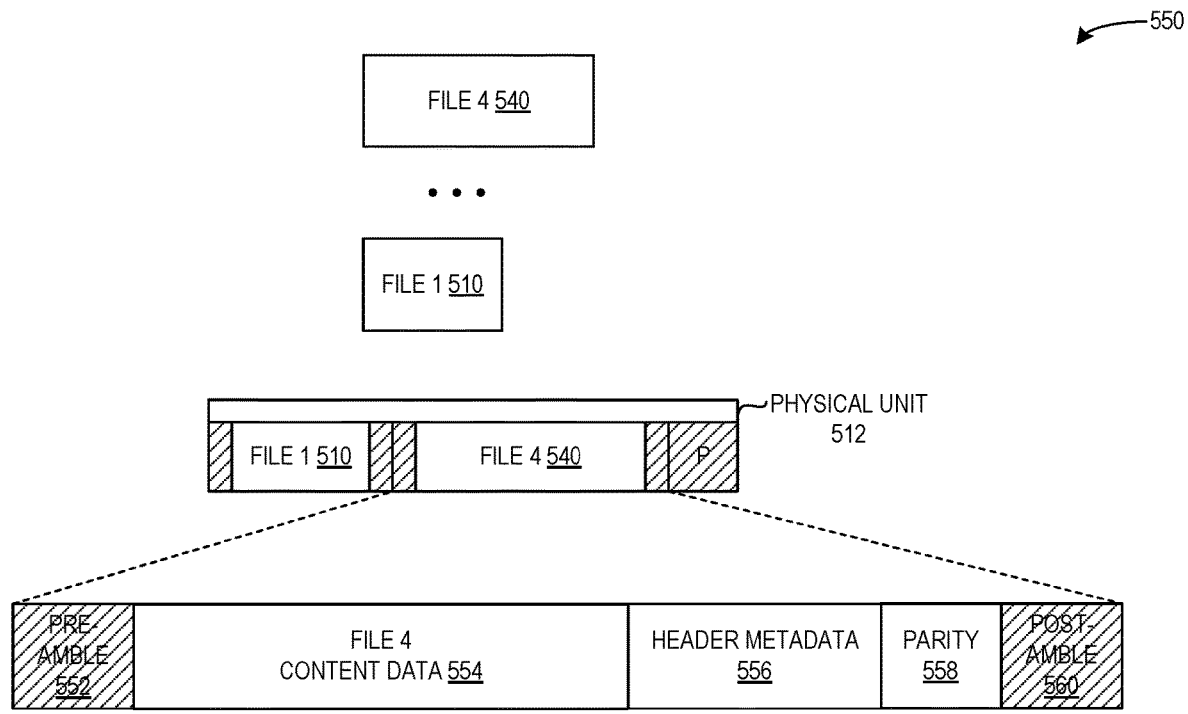
FIG. 5B illustrates an exemplary format for data stored in a physical unit, including data stored as multiple files in the same physical unit, in accordance with an embodiment of the present application.

FIG. 5B illustrates an exemplary format 550 for data stored in a physical unit, including data stored as multiple files in the same physical unit, in accordance with an embodiment of the present application. Format 550 can indicate a format for file 4 540 and file 1 510 as stored in physical unit 512. The system can store data by wrapping each file with a pre-amble and a post-amble. The pre-amble and post-amble can each include a fixed and easily recognizable data pattern, e.g., a repeated coding such as "111000111000." Between the pre-amble and the post-amble, the system can store content data, metadata, and parity information for ECC and data recovery. For example, physical unit 512 can store both file 1 510 and file 4 540, where each file is "wrapped" with a pre-amble and a post-amble. File 4 540 can thus include: a pre-amble 552; file 4 content data 554; header metadata 556; parity 558; and a post-amble 560.

The system can use the pre-amble and the post-amble to separate or distinguish between different files of different lengths stored in a same physical unit, and can further use the header metadata to read a requested file. The system therefore only needs to store and use the stored offset and the length to identify the physical location of the requested file, as described herein, which can result in using fewer bits in the mapping table. As a result, the system can provide further improvements by recording or storing less information in the mapping table.

In some embodiments, the system can perform ECC encoding for the data in each physical unit, such that merged files in a physical unit share the parity information. When performing read operations, the system can concatenate the file name and file path of the requested file to obtain an input string, and perform a hash function on the input string to obtain a calculated hash value, as described above in relation to FIGS. 2 and 4. The system can perform a lookup in the ascending-order mapping table based on the calculated hash value, to obtain an entry which has a hash value which matches the calculated hash value. The system can obtain the physical location from the entry, e.g., the offset and length. If the read request is for only one file from one or more physical units (i.e., the data is stored as a first and only file in a physical unit or units), the system can read data from the one (or more) physical units, drop the padded data from the single (or last) physical unit, and return the obtained file to a requesting host.

If the read request is for a file with a length of 1 physical unit occupied (e.g., the data is stored as a first file with at least a second or other file in the same physical unit), the system can read the data from the full physical unit of data, perform an ECC-decoding on the read data to obtain ECC-decoded data, and identify in the ECC-decoded data the requested file based on the pre-amble and post-amble. The system can drop a remaining portion of the full unit of data (i.e., whatever portion does not correspond to the requested file), and return the identified file to a requesting host.

Exemplary Method for Facilitating a Write Request and a Read Request

Figure 6A:
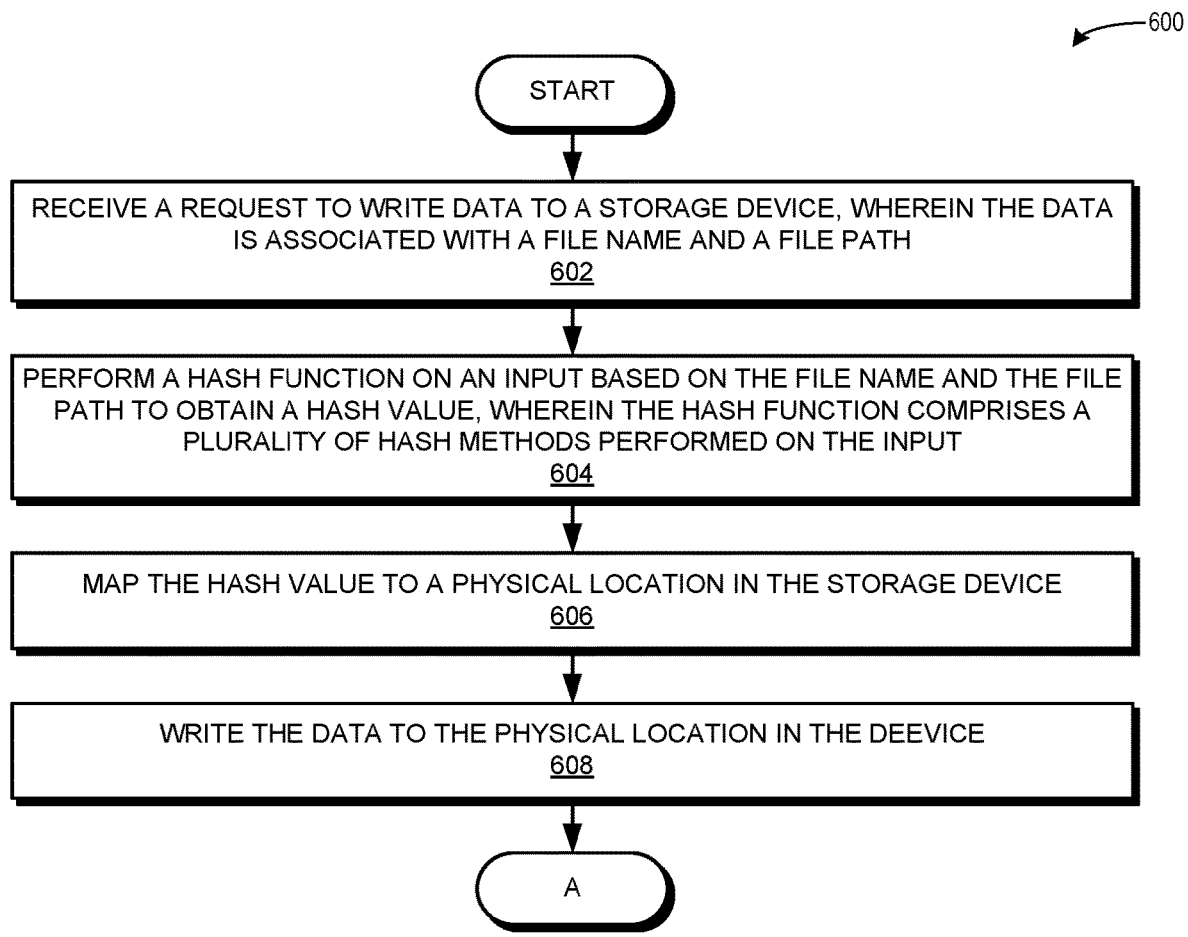
FIG. 6A presents a flowchart illustrating a method for facilitating operation of a storage system, including placing data or performing a write operation, in accordance with an embodiment of the present application.

FIG. 6A presents a flowchart 600 illustrating a method for facilitating operation of a storage system, including placing data or performing a write operation, in accordance with an embodiment of the present application. During operation, the system receives a request to write data to a storage device, wherein the data is associated with a file name and a file path (operation 602). The system performs a hash function on an input based on the file name and the file path to obtain a hash value, wherein the hash function comprises a plurality of hash methods performed on the input (operation 604). The system maps the hash value to a physical location in the storage device (operation 606). The system writes the data to the physical location in the storage device (operation 608), and the operation continues at Label A of FIG. 6B.

Figure 6B:
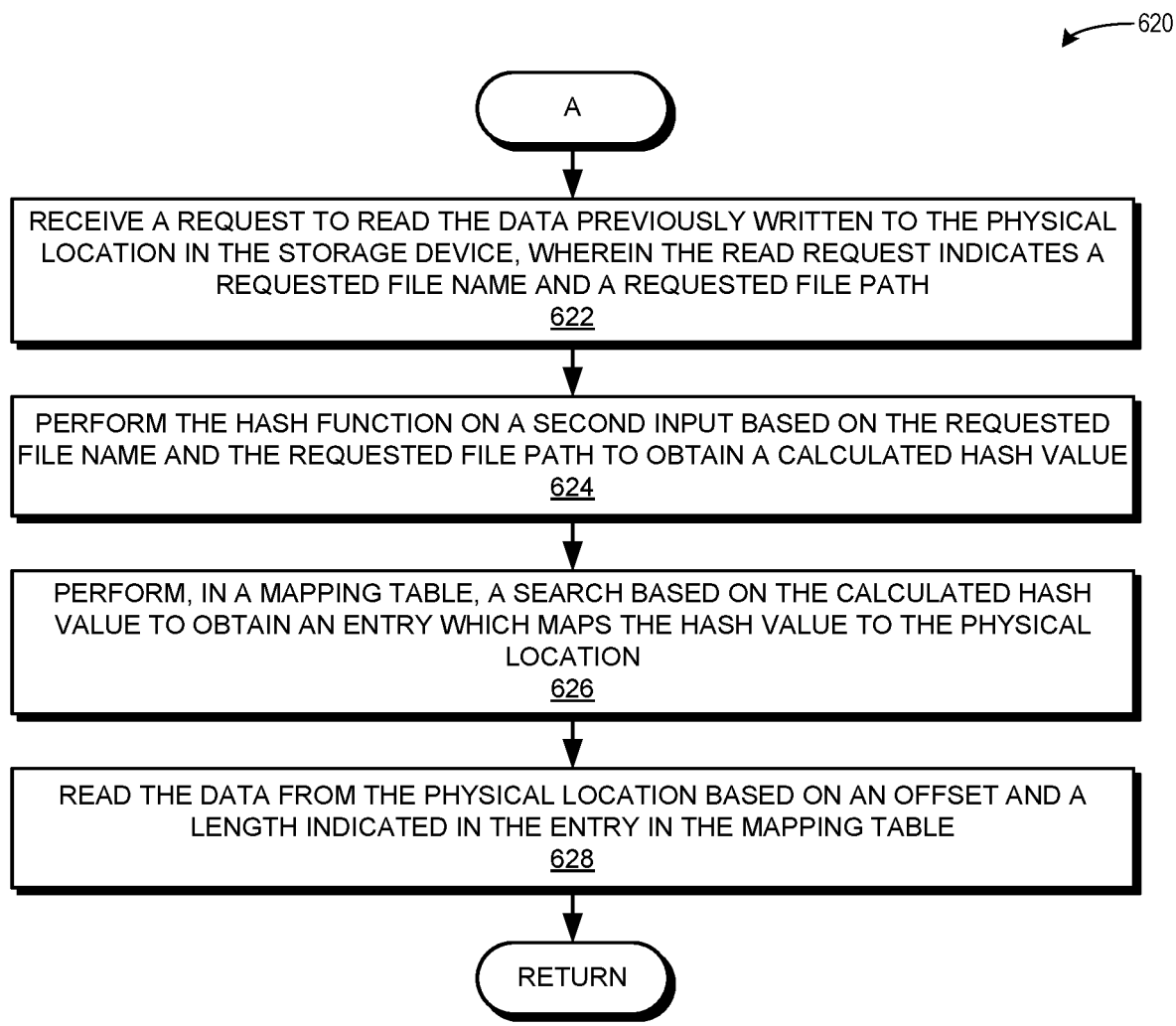
FIG. 6B presents a flowchart illustrating a method for facilitating operation of a storage system, including reading data, in accordance with an embodiment of the present application.

FIG. 6B presents a flowchart 620 illustrating a method for facilitating operation of a storage system, including reading data, in accordance with an embodiment of the present application. During operation, the system receives a request to read the data previously written to the physical location in the storage device, wherein the read request indicates a requested file name and a requested file path (operation 622). The system performs the hash function on a second input based on the requested file name and the requested file path to obtain a calculated hash value (operation 624). The system performs, in a mapping table, a search based on the calculated hash value to obtain an entry which maps the hash value to the physical location (operation 626). That is, the system searches for an entry with an index (i.e., a final hash value, as in non-collision hash 406 of mapping table 460) which matches the calculated hash value. The system reads the data from the physical location based on the offset and the length (operation 628), and the operation returns.

Exemplary Computer System and Apparatus

Figure 7:
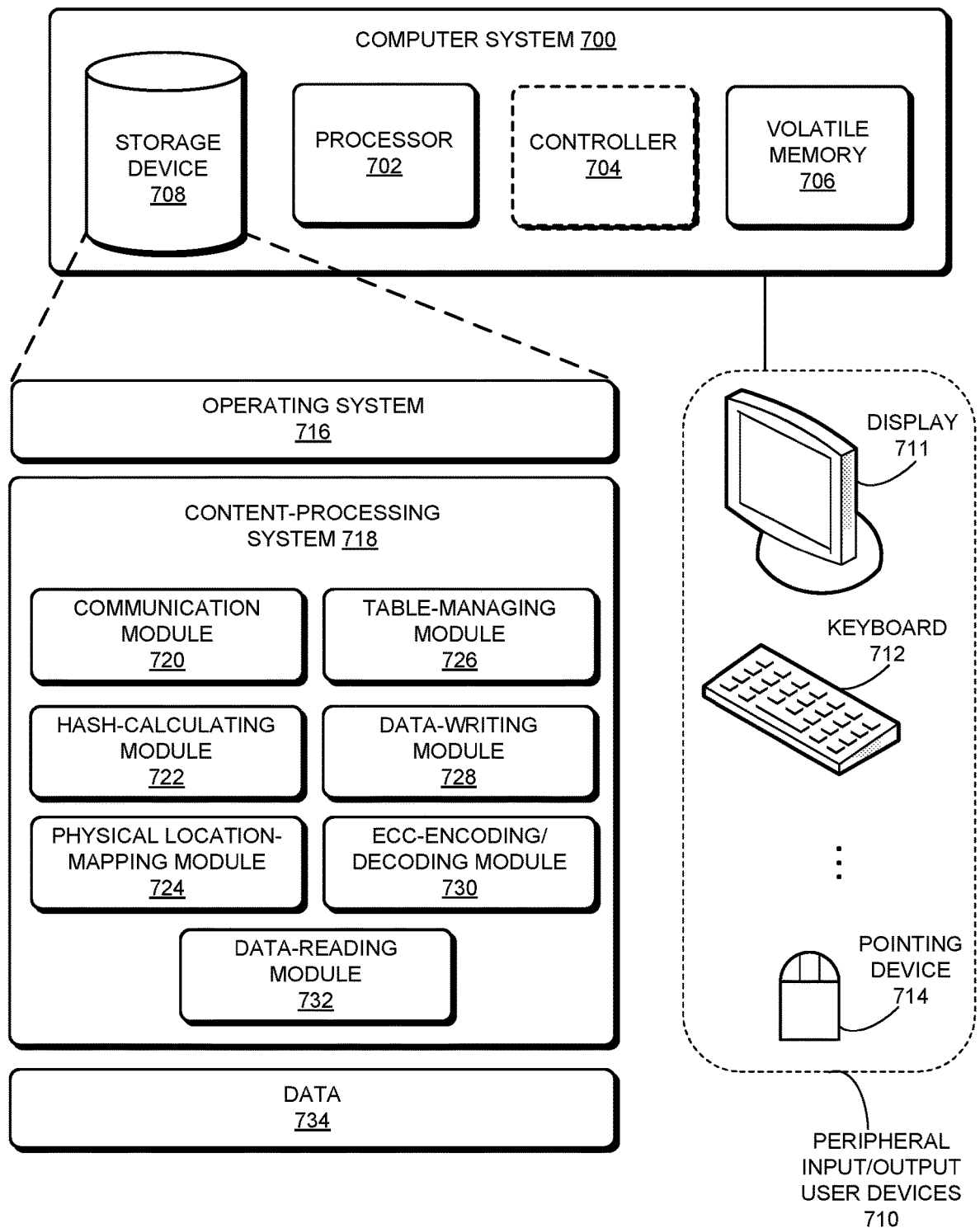
FIG. 7 illustrates an exemplary computer system that facilitates operation of a storage system, in accordance with an embodiment of the present application.

FIG. 7 illustrates an exemplary computer system that facilitates operation of a storage system, in accordance with an embodiment of the present application. Computer system 700 includes a processor 702, a volatile memory 706, and a storage device 708. In some embodiments, computer system 700 can include a controller 704 (indicated by the dashed lines). Volatile memory 706 can include, e.g., random access memory (RAM), that serves as a managed memory, and can be used to store one or more memory pools. Storage device 708 can include persistent storage which can be managed or accessed via processor 702 (or controller 704). Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 734.

Content-processing system 718 can include instructions, which when executed by computer system 700, can cause computer system 700 or processor 702 to perform methods and/or processes described in this disclosure. Specifically, content-processing system 718 can include instructions for receiving and transmitting data packets, including data to be read or written, an input/output (I/O) request (e.g., a read request or a write request), a hash value, and a physical location (communication module 720).

Content-processing system 718 can further include instructions for receiving a request to write data to a storage device, wherein the data is associated with a file name and a file path (communication module 720). Content-processing system 718 can include instructions for performing a hash function on an input based on the file name and the file path to obtain a hash value, wherein the hash function comprises a plurality of hash methods performed on the input (hash-calculating module 722). Content-processing system 718 can also include instructions for mapping the hash value to a physical location in the storage device (physical location-mapping module 724 and table-managing module 726). Content-processing system 718 can include instructions for writing the data to the physical location in the storage device (data-writing module 728).

Content-processing system 718 can additionally include instructions for receiving a request to read the data previously written to the physical location in the storage device, wherein the read request indicates a requested file name and a requested file path (communication module 720). Content-processing system 718 can include instructions for performing the hash function on a second input based on the requested file name and the requested file path to obtain a calculated hash value (hash-calculating module 722). Content-processing system 718 can include instructions for performing, in a mapping table, a search based on the calculated hash value to obtain an entry which maps the hash value to the physical location (table-managing module 726). Content-processing system 718 can include instructions for reading the data from the physical location based on the offset and the length (data-reading module 732). Content-processing system 718 can further include instructions for performing an error correction code (ECC) encoding or decoding on data (ECC-encoding/decoding module 730).

Data 734 can include any data that is required as input or generated as output by the methods and/or processes described in this disclosure. Specifically, data 734 can store at least: data; a request; a read request; a write request; an input/output (I/O) request; data or metadata associated with a read request, a write request, or an I/O request; an input; a logical block address (LBA); a physical block address (PBA); a hash value; a set of hash values; a file; a file name; a file path; hierarchical or directory information; one or more hash methods; an indicator of a hash method; a string; a concatenation of a file name and a file path; a concatenation of hash values, which are each the result of a distinct hash method; an input; an indicator of a physical unit in a non-volatile memory; an indicator of a physical location; an offset; a length; an operation to be performed by a host driver or by a device controller; an allocation or releasing of space; defragmented data; refreshed or scrubbed data; a data placement; merged or flushed data; a media characterization; an indicator of a media interface; an error correction code; encoded or decoded data; a data recovery method; an integrity check; a CRC value; an encryption algorithm; encrypted or decrypted data; processed data; an intensity; a predetermined threshold; a mapping table; an index; a hash value; a real-time hash value; a dynamically calculated hash value; a result of a search; parity data; parity data associated with a physical unit; padding bits; a format for data stored in a physical unit; a format for a file stored in a physical unit; a pre-amble; data content; header metadata; parity information for a file; and a post-amble.

Figure 8:
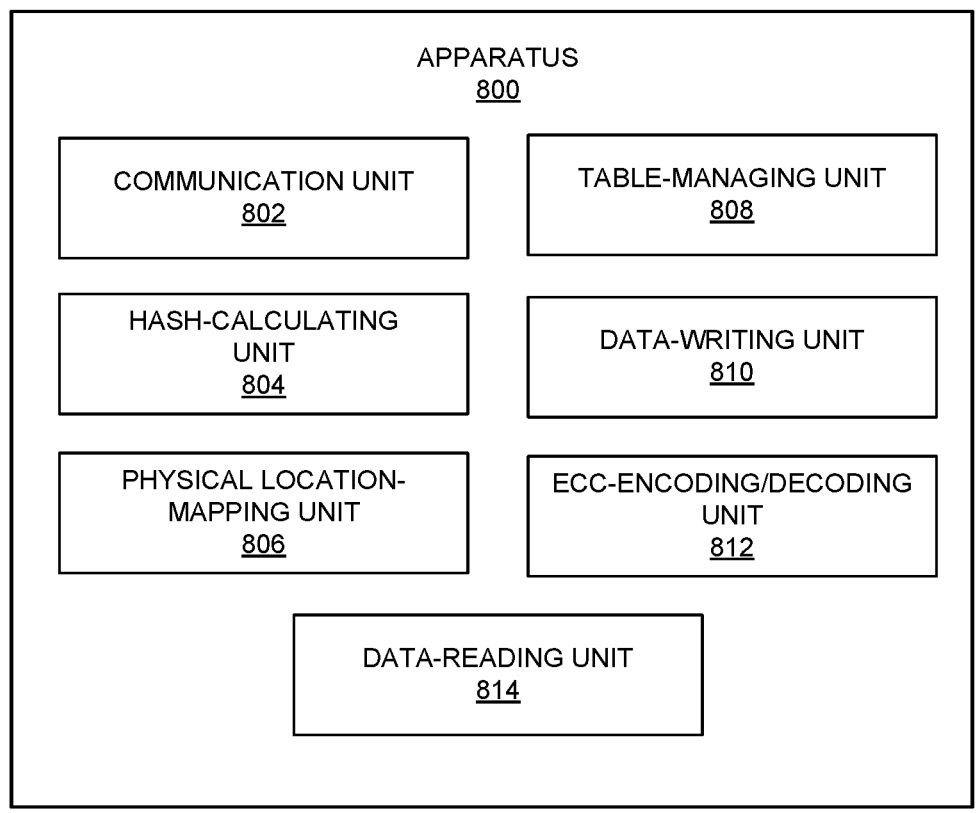
FIG. 8 illustrates an exemplary apparatus that facilitates operation of a storage system, in accordance with an embodiment of the present application.

FIG. 8 illustrates an exemplary apparatus 800 that facilitates operation of a storage system, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Furthermore, apparatus 800 may be integrated in a computer system, or realized as a separate device or devices capable of communicating with other computer systems and/or devices. Apparatus 800 can include at least one hard disk drive.

Apparatus 800 can comprise modules or units 802-814 which are configured to perform functions or operations similar to modules 720-732 of computer system 700 of FIG. 7, including: a communication unit 802; a hash-calculating unit 804; a physical location-mapping unit 806; a table-managing unit 808; a data-writing unit 810; an ECC-encoding/decoding unit 812; and a data-reading unit 814.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
   receiving, by a controller of a storage device from a host, a request to write data to the storage device, wherein the data is associated with a file name and a file path, and wherein the controller performs one or more of:
      providing a characterization or other information related to a non-volatile memory of the storage device;
      providing a media interface to storage media of the storage device;
      performing an error correction code (ECC) encoding or decoding on data;
      performing a data recovery method;
      performing an integrity check, including a cyclical redundancy check (CRC);
      encrypting or decrypting data; and
      processing data which requires an intensity which is greater than a predetermined threshold;
   performing a hash function on an input based on the file name and the file path to obtain a hash value, wherein the hash function comprises a plurality of hash methods performed on the input;
   mapping the hash value to a physical location in the storage device; and
   writing the data to the physical location in the storage device.

2. The method of claim 1, wherein the host performs one or more of the following functions:
   mapping files to physical locations, including mapping the hash value to the physical location;
   allocating physical space in the storage device;
   freeing physical space in the storage device;
   defragmenting data;
   performing a data refresh or a data scrub operation;
   determining where to place a file;
   performing a data merge or a data flush operation;
   providing assurance for data persistency; and
   providing protection during a power loss.

3. The method of claim 1,
   wherein the hash value comprises an index for an entry in a mapping table,
   wherein the mapping table is sorted in an ascending order based on the hash value as the index, and
   wherein the physical location in the mapping table indicates an offset and a length corresponding to the data.

4. The method of claim 1, further comprising:
   receiving a request to read the data previously written to the physical location in the storage device, wherein the read request indicates a requested file name and a requested file path;
   performing the hash function on a second input based on the requested file name and the requested file path to obtain a calculated hash value;
   performing, in a mapping table, a search based on the calculated hash value to obtain an entry which maps the hash value to the physical location; and
   reading the data from the physical location based on the offset and the length.

5. The method of claim 4, wherein the data is stored as a first and only file in a physical unit of a non-volatile memory of the storage device, and wherein the method further comprises:
   responsive to detecting a condition, padding data to the first file until the physical unit is full.

6. The method of claim 5, wherein reading the data from the physical location based on the offset and the length further comprises:
   reading a physical unit associated with the physical location based on the offset to obtain a full unit of data;
   dropping the padded data from the full unit of data to obtain the first file; and
   returning, to a requesting host, the obtained first file.

7. The method of claim 4, wherein the data is stored as a first file in a physical unit of a non-volatile memory of the storage device with at least a second file, and wherein the method further comprises:
   storing the first file and at least the second file based on a format which includes one or more of a pre-amble, content of the data, metadata corresponding to a header for the content, parity information for the data, and a post-amble;

encoding the stored first file and at least the second file based on an error correction code (ECC) to obtain parity bits corresponding to the stored first file and at least the second file; and storing the parity bits in the physical unit appended to the stored first file and at least the second file.

8. The method of claim 7, wherein reading the data from the physical location based on the offset and the length further comprises:

reading data from a physical unit associated with the physical location based on the offset to obtain a full unit of data, wherein the full unit of data includes the stored first file and at least the second file and the corresponding parity bits;

decoding, based on the error correction code, the full unit of data to obtain ECC-decoded data;

identifying, in the obtained ECC-decoded data, the first file based on a pre-amble and a post-amble stored as part of the first file; and returning, to a requesting host, the identified first file.

9. A computer system, comprising:

a processor; and a memory coupled to the processor and storing instructions which, when executed by the processor, cause the processor to perform a method, the method comprising:

receiving, by a controller of a storage device from a host, a request to write data to the storage device, wherein the data is associated with a file name and a file path, and wherein the host performs one or more of:

mapping files to physical locations, including mapping the hash value to the physical location;

allocating physical space in the storage device;

freeing physical space in the storage device;

defragmenting data;

performing a data refresh or a data scrub operation;

determining where to place a file;

performing a data merge or a data flush operation;

providing assurance for data persistency; and providing protection during a power loss; and wherein the controller performs one or more of the following functions:

providing a characterization or other information related to a non-volatile memory of the storage device;

providing a media interface to storage media of the storage device;

performing an error correction code (ECC) encoding or decoding on data;

performing a data recovery method;

performing an integrity check, including a cyclical redundancy check (CRC);

encrypting or decrypting data; and processing data which requires an intensity which is greater than a predetermined threshold;

performing a hash function on an input based on the file name and the file path to obtain a hash value, wherein the hash function comprises a plurality of hash methods performed on the input;

mapping the hash value to a physical location in the storage device; and writing the data to the physical location in the storage device.

10. The computer system of claim 9, wherein the hash value comprises an index for an entry in a mapping table, wherein the mapping table is sorted in an ascending order based on the hash value as the index, and wherein the physical location in the mapping table indicates an offset and a length corresponding to the data.

11. The computer system of claim 9, wherein the method further comprises:

receiving a request to read the data previously written to the physical location in the storage device, wherein the read request indicates a requested file name and a requested file path;

performing the hash function on a second input based on the requested file name and the requested file path to obtain a calculated hash value;

performing, in a mapping table, a search based on the calculated hash value to obtain an entry which maps the hash value to the physical location; and reading the data from the physical location based on the offset and the length.

12. The computer system of claim 11, wherein the data is stored as a first and only file in a physical unit of a non-volatile memory of the storage device, and wherein the method further comprises:

responsive to detecting a condition which requires no current processing of I/O data, padding data to the first file until the physical unit is full.

13. The computer system of claim 12, wherein reading the data from the physical location based on the offset and the length further comprises:

reading a physical unit associated with the physical location based on the offset to obtain a full unit of data;

dropping the padded data from the full unit of data to obtain the first file; and returning, to a requesting host, the obtained first file.

14. The computer system of claim 11, wherein the data is stored as a first file in a physical unit of a non-volatile memory of the storage device with at least a second file, and wherein the method further comprises:

storing the first file and at least the second file based on a format which includes one or more of a pre-amble, content of the data, metadata corresponding to a header for the content, parity information for the data, and a post-amble;

encoding the stored first file and at least the second file based on an error correction code (ECC) to obtain parity bits corresponding to the stored first file and at least the second file; and storing the parity bits in the physical unit appended to the stored first file and at least the second file.

15. The computer system of claim 14, wherein reading the data from the physical location based on the offset and the length further comprises:

reading data from a physical unit associated with the physical location based on the offset to obtain a full unit of data, wherein the full unit of data includes the stored first file and at least the second file and the corresponding parity bits;

decoding, based on the error correction code, the full unit of data to obtain ECC-decoded data;

identifying, in the obtained ECC-decoded data, the first file based on a pre-amble and a post-amble stored as part of the first file; and returning, to a requesting host, the identified first file.

16. An apparatus, comprising:
a communication module configured to receive, by a controller of a storage device from a host, a request to write data to the storage device, wherein the data is associated with a file name and a file path, and wherein the controller performs one or more of:
  providing a characterization or other information related to a non-volatile memory of the storage device;
  providing a media interface to storage media of the storage device;
  performing an error correction code (ECC) encoding or decoding on data;
  performing a data recovery method;
  performing an integrity check, including a cyclical redundancy check (CRC);
  encrypting or decrypting data; and
  processing data which requires an intensity which is greater than a predetermined threshold;
a hash-calculating module configured to perform a hash function on an input based on the file name and the file path to obtain a hash value, wherein the hash function comprises a plurality of hash methods performed on the input;
a physical location-mapping module configured to map the hash value to a physical location in the storage device; and
a data-writing module configured to write the data to the physical location in the storage device.

* * * * *